Figure 1:
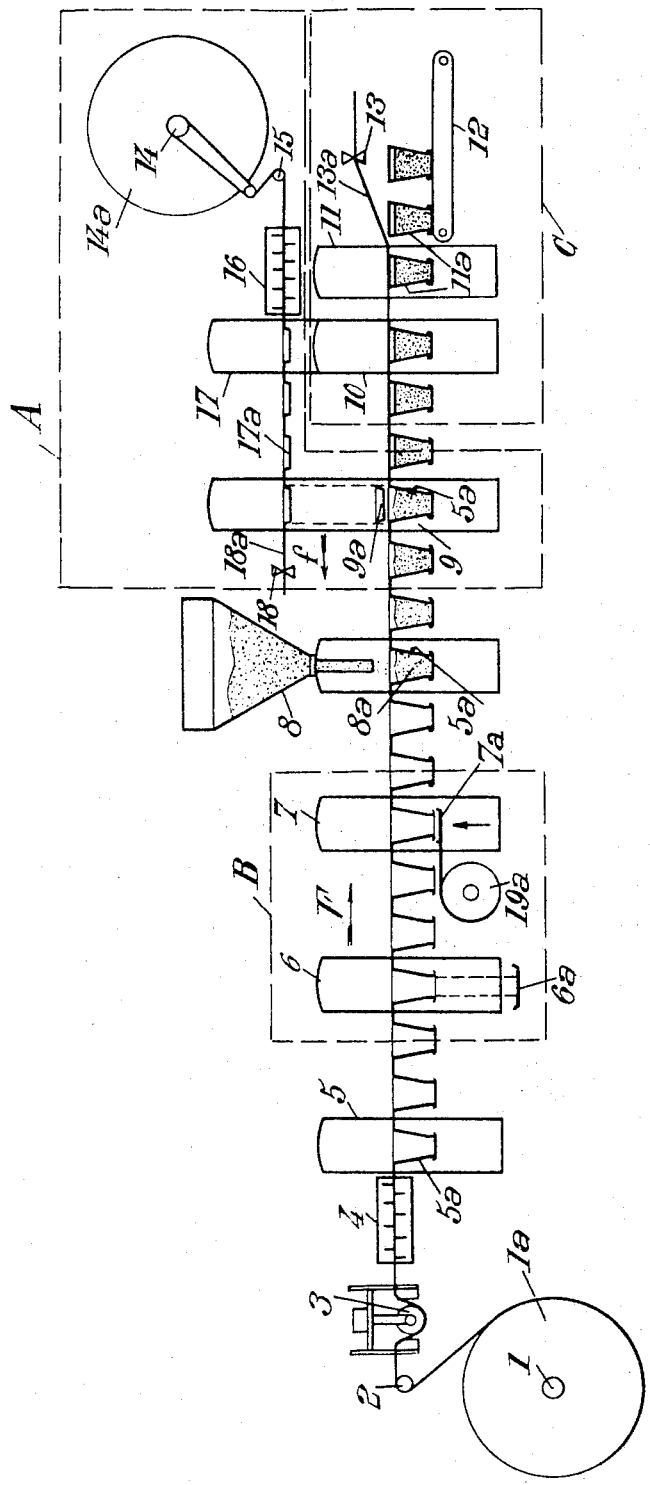

United States Patent Office 3,430,411
Patented Mar. 4, 1969

3,430,411
MANUFACTURE OF YOGURT AND SIMILAR FILLED CONTAINERS
Jacques Honoré Gaspard Ollier, 17 Rue General Henrion-Bertier, 92 Neuilly-sur-Seine, France; Georges Frédéric Grosshans, 53bis Rue de Boulainvilliers, 75 Paris, France; and Robert Gaston Masson, 10 Boulevard de Courbevoie, 92 Neuilly-sur-Seine, France
Filed Nov. 25, 1966, Ser. No. 596,870
U.S. Cl. 53—30    5 Claims
Int. Cl. B65b 43/08, 3/02

The present invention relates to the manufacture of containers to be filled with matter and closed, said containers comprising a frusto-conical lateral surface diverging toward the bottom, a closed bottom and an easily removable lid. The invention is more especially concerned with yogurt containers.

It is known that, at the present time, yogurt is stored not only in glass jars but also and chiefly in two kinds of containers, to wit a relatively old type consisting of a body of cardboard or a plastic material of frusto-conical shape diverging in the downward direction closed by an aluminum cover flanged on the upper edge of the container, such a kind of container having the drawback that it is not liquid-tight so that the preservation of yogurt is of limited duration, and a more recent type resulting from our prior studies on the question and manufactured in the machine described in the United States Patent No. 3,000,-157 of Sept. 19, 1961 in the name of applicants. The containers according to this second type have substantially the shape of an inverted frustum of a pyramid (that is to say flaring out toward the top) and being covered with a peelable film, either of a plastic material or of aluminum, which is welded on the containers. Thus a very good liquid-tightness is obtained which ensures a longer preservation of the yogurt, which also results from the fact that the container is made from a preliminarily heated thermoplastic band, which produces some sterilization of the container prior to its being filled with yogurt. On the contrary this second type of container has the drawbacks that, due to the fact that it is wider at the top, its stability is not as good as that of the containers of the first type and chiefly that it does not so well hold the yogurt contained therein, because the liquid of the yogurt has a greater tendency to leak out toward the top due to the bulging shape in this direction.

The chief object of the present invention is to make the above mentioned containers of the first type such that they comply better than up to now with the various requirements of practice, in particular concerning, on the one hand, the possibility of making them in an automatic machine, without manual handling and from thermoplastic sheets, by heat forming (so that a good sterilization is obtained), and on the other hand, the fluidtightness that is obtained since the lid or cover is welded.

The invention consists essentially, concerning the method, of making filled and closed containers, in particular yogurt containers, by heat forming, from a thermoplastic sheet or band, flaring containers opening toward the top, in cutting the temporary bottoms of these containers, in welding, at the place of these bottoms, peelable lids for the finished containers which will be turned upside down, in filling said containers through the open top ends thereof, in welding on the opened upper ends of these containers the future bottoms and in detaching the containers, filled and welded, from the sheet or band from which they have been heat formed.

The invention consists concerning the device, in including in a machine intended to manufacture such containers, in combination, means for heat forming, from a thermoplastic sheet or band, containers which flare out toward the top where they are open, means for cutting the temporary bottoms, of these containers, means for welding, at the place of these bottoms, peelable covers or lids for the finished containers which will be turned upside down, means for filling said containers through the open ends thereof, means for welding to the open upper ends of these containers the future bottoms and means for detaching the filled and welded containers from the sheet or band from which they have been heat formed.

Furthermore, in the preferred embodiments:

On the one hand, concerning the method, the peelable lids or covers and the final bottoms are made from two other sheets or bands, those for the bottoms being preferably of the same thermoplastic material as the sheet or band from which the containers have been heat formed, whereas the sheets or bands for the cover or lids are preferably made either of the same thermoplastic material, or of aluminum (of the thermoglueing type), On the other hand, concerning the device, the various above cited means are carried by stations or units at least some of which are movable longitudinally with respect to the frame of the machine, as indicated in the above mentioned prior patent.

The present invention is more especially concerned with the manufacture of yogurt containers by the machine of the type described in said prior patent.

Figure 2:
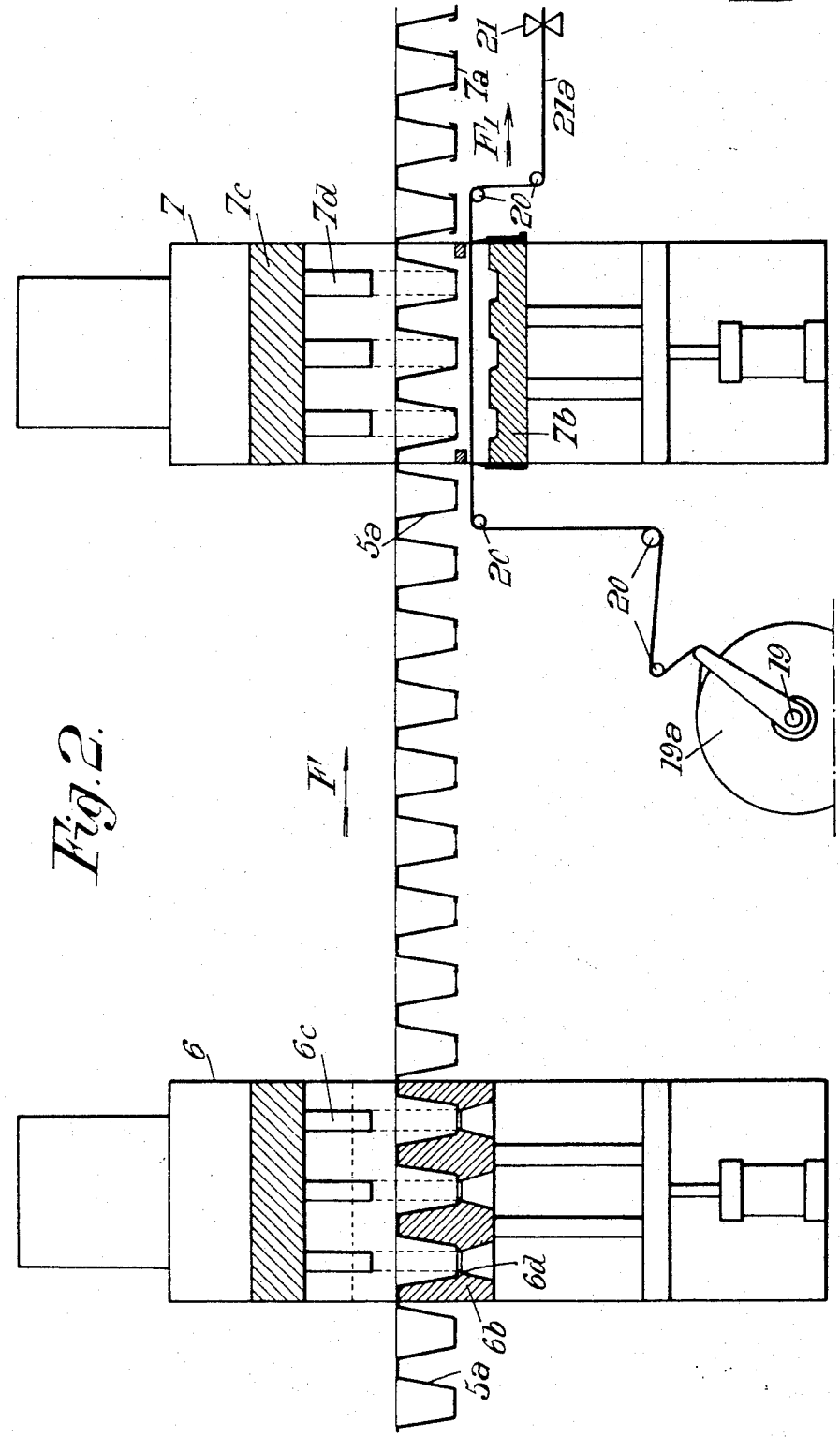
Figure 3:
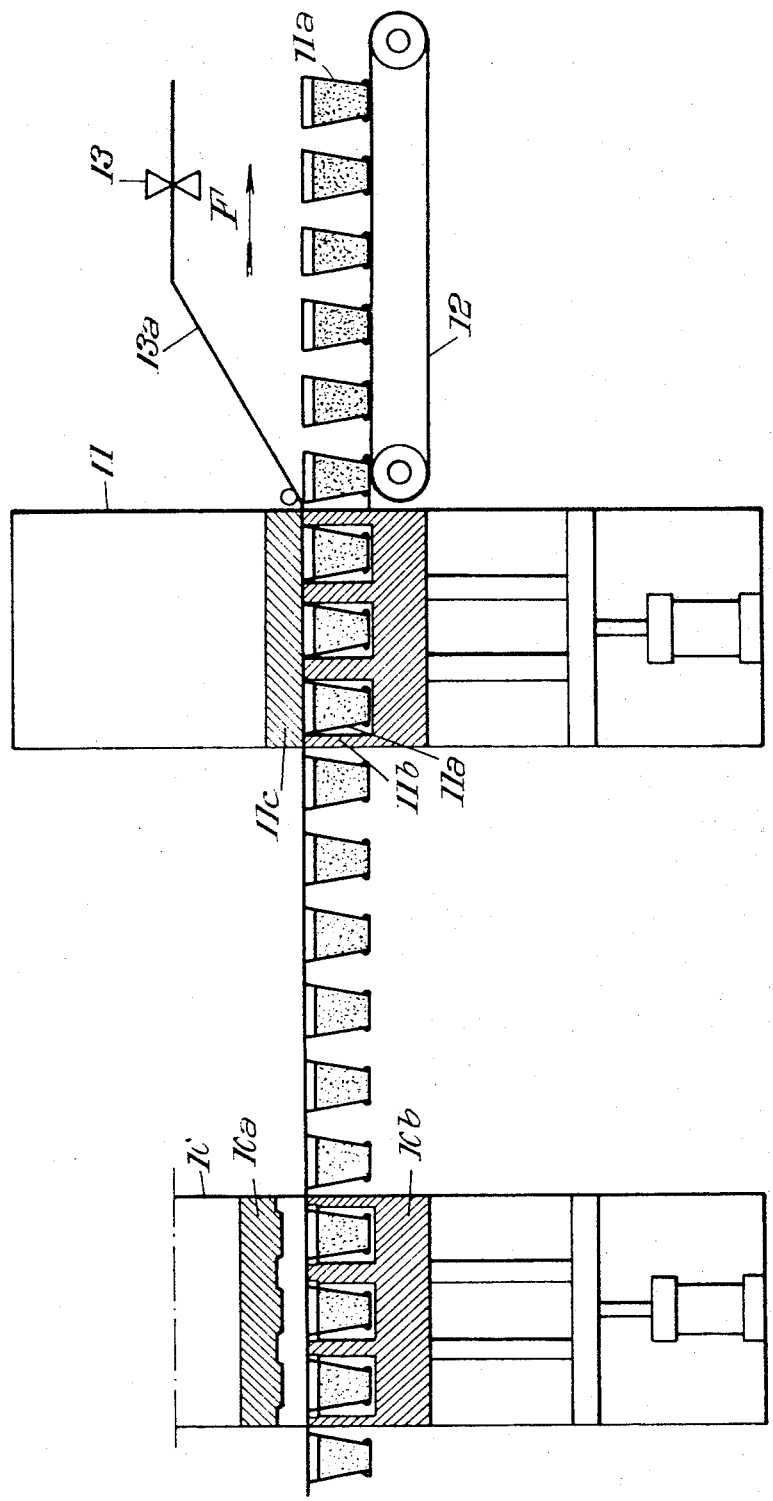

A preferred embodiment of the present invention will be hereinafter described with reference to the appended drawings, given merely by way of example, and in which:

FIG. 1 diagrammatically shows, in longitudinal section, a machine according to the present invention for manufacturing yogurt containers;

FIG. 2 shows, also in longitudinal section but on a larger scale and in a more detailed fashion, a portion of the machine of FIG. 1 wherein the temporary bottoms are punched out and the peelable covers are formed and welded on the containers; and FIG. 3 is a sectional view analogous to FIG. 2 but showing a portion of the machine of FIG. 1 wherein the final bottoms are welded and the containers are detached from the band.

In FIG. 1, we have diagrammatically shown a machine according to the present invention which comprises, from the left toward the right, on a longitudinal frame not shown by the drawing:

Reel carrier 1 carrying a reel 1a of a thermoplastic band, for instance a polystyrene band from which the containers are to be made;

A roller 2;

An unwinder 3 for the band;

A heating unit or box 4 for the thermoplastic material, this unit or box being for instance made as described in the above mentioned prior patent, that is to say including screens which prevent the edges of the band from being heated;

A unit 5 for the heat forming of containers 5a by means of a punch cooperating with at least one matrix, advantageously with the utilization either of a vacuum or of filtered compressed air, this unit 5 being preferably of the type described in the above mentioned prior patent;

A unit 6 for punching out the temporary bottoms 6a formed together with containers 5a in the heat forming unit 5, this unit 6 being illustrated in a more detailed manner in FIG. 2, which will be hereinafter referred to;

A unit 7 for welding peelable covers or lids 7d (for the finished containers which will be turned upside down) in the place of the cut temporary bottoms 6a, this unit 7 (which receives from a reel 19a the sheet from which covers or lids 7a are punched out) being also illustrated in a more detailed fashion in FIG. 2 and more fully described hereinafter;

Hopper 8 for filling containers 5a, from the top, with yogurt 8a, this hopper being advantageously disposed and made as described in the above mentioned prior patent;

A unit 9 for forming and lowering the future bottoms 9a onto the open upper portion of containers 5a filled with yogurt, complementary details concerning this last mentioned unit being hereinafter given;

A unit 10, forming a welding station, which performs the welding of the future bottoms 9a on the containers 5a filled with yogurt, this unit 10, which is illustrated by FIG. 3, being more fully described hereinafter;

A punching out unit 11 in which the yogurt containers 11a, filled with yogurt and welded, are detached from the thermoplastic band from which they have been made, these detached containers being removed by means of a conveyor 12; and Means 13 pulling the thermoplastic band 13a from which the finished containers 11a have been detached, said means 13 being advantageously made as disclosed in the above mentioned prior patent, that is to say being capable of pulling said band through its edges in a step-by step fashion and in the direction of arrow F, when units 5, 6, 7, 8, 9, 10 and 11 are not operative, the length of every step corresponding to the formation of one or several containers 5a in the longitudinal direction, as the case may be.

As a whole, the machine which has been described is of the type disclosed in the above mentioned prior patent, in particular concerning units 4, 5, 8, 10, 11 and 13, these units being, at least for most of them, movable longitudinally along the machine frame so as to permit adjustment.

Before describing in a more detailed manner units 6 and 7 with reference to FIG. 2 and units 10 and 11 with reference to FIG. 3, we will give some details concerning the manufacture of the final bottoms 9a the fixation of which on containers 5a filled with yogurt takes place in unit 9. Bottoms 9a are formed and brought into place by a system located in frame A shown in dotted lines in FIG. 1 and which described in detailed fashion in the copending application, Ser. No. 596,181, filed Nov. 22, 1966 by us for "Improvements in Machines for Forming and Applying Lids or Bottoms on Containers."

However, in order to facilitate the understanding of the operation of the machine according to FIG. 1, some explanations will be given concerning the units of system A. This system includes:

A reel carrier 14 supporting a reel 14a of a band of a thermoplastic material for forming the final bottoms, this material being for instance polystyrene;

Unwinding means 15 for the band;

A heating box 16 analogous to box 4;

A heat forming unit 17 analogous to unit 5, this unit 17 being combined into a whole with welding unit 10 as shown by FIG. 1;

A unit 9 in which the formed band 17a is cut into a series of bottoms 9a which are lowered either one by one or by sets of several bottoms (as stated in a more detailed fashion in the above mentioned patent application) onto the open upper end of the filled yogurt containers 5a; and A step-by-step pulling device analogous to means 13 and working in synchronism therewith for pulling band 18a in the direction of arrow f.

Reference will now be made to FIG. 2, which shows the portion B of FIG. 1 in a more detailed fashion, it being supposed that in each of the units 6 and 7 (same as in units 4, 5, 8, 9, 10 and 11) we work with a pitch corresponding to three containers in the longitudinal direction. This figure illustrates the structure and operation of unit 6 for punching out the temporary bottoms 6a and of unit 7 for welding the peelable covers 7a in a more detailed manner.

The punching out unit 6 essentially comprises a matrix 6b and punches 6c shown in solid lines in the upper position when the pulling means 13 cause the thermoplastic band to travel in the direction of arrow f, and in dotted lines in the lower position where they perform, in cooperation with the orifices 6d of matrix 6b, the cutting of temporary bottoms 6a which drop as shown by FIG. 1.

Concerning peelable covers or lids 7a, they are advantageously made from a reel 19a of thermoglueing aluminum sheet carried by a spindle 19. The sheet in pulled in the direction of arrow $F_1$, along a path determined by rollers 20, by step-by-step pulling means 21 analogous to means 13 and working in synchronism therewith. Along its path, aluminum sheet 21a is brought through the welding unit 7 parallel to the direction of movement of containers 5a formed in unit 5 and which have been deprived from their temporary bottoms in unit 6. Unit 7 is in fact a composite unit which simultaneously performs the punching out and welding operations, owing to electrode 7b and counter electrode 7c provided with plunger pistons 7d (shown in solid lines in upper position, when the step-by-step pulling means 13 and 21 are moving bands 13a and 21a in the direction of arrow F and $F_1$, and in dotted lines in lowered position, when they punch out peelable covers or lids 7a and cause them to be welded to containers 5a).

In FIG. 3 we have shown the structure located in the rectangle C of FIG. 1, that is to say the welding unit 10 and the unit 11 for punching out the final bottoms, and also conveyor 12 and pulling means 13. But, as a matter of fact, it is units 10 and 11 that have been illustrated in detailed fashion in the case where, as for FIG. 2, a pitch corresponds to three yogurt containers in the longitudinal direction. Unit 10, which is similar to the welding unit of the above mentioned prior patent, essentially comprises a welding electrode 10a cooperating with a counter electrode 10b whereas unit 11, which detaches the finished containers 11a, comprises knives or punches 11b which cooperate with a matrix 11c, this unit 11 being also advantageously of the type disclosed in said prior patent.

It will be noted that the various units are, the same as the units of the above mentioned prior patent, advantageously operated by means of compressed air which permits, owing to flexible compressed air feeding conduits, longitudinal displacement thereof along the machine frame.

Complementary information concerning the operation of the chief units will be found in the detailed description of the above mentioned prior patent.

It will be noted that bands of reels 1a, 14a and 19a may have a width corresponding to the formation of one or several containers in parallel, the respective units treating simultaneously one or several containers in the longitudinal direction but, also in the transverse direction.

The machine above described, the operation of which results sufficiently from the preceding description, has, over existing machines of the kind in question, many advantages and in particular the following ones:

It permits of automatically producing yogurt or similar product containers or the like ensuring an excellent preservation of the product due to the fact that yogurt or the like has been introduced into containers formed essentially by heating, whereby there is a good preliminary sterilization and little tendency of the product to leak out owing to the fact that the containers are of flaring shape toward the bottom, which ensures a very good stability of the containers.

The machine has the chief advantages of that described in the above mentioned prior patent and which has proved its quality for many years.

Finally the machine may utilize a great number of the units, and also the frame, of a machine made according to said prior patent.

In a general manner while we have in the above description disclosed what we deem to be a practical and efficient embodiment of the present invention, it should be well understood that we do not wish to be limited thereto as there might be changes made in the arrangement, disposition and form of the parts without departing from the principle of the present invention as comprehended wtihin the scope of the appended claims.

In particular the invention might be applied to a machine having several stations working in a discontinuous manner and making use, instead of bands wound to form reels, of sheets of predetermined dimensions.

In the appended claims, the term "sheet" is used to designate with a band, i.e., a sheet of elongated shape in one direction and a sheet having substantial dimensions in both directions.

What we claim is:

1. A method of making filled containers which comprises heat forming, from a thermoplastic sheet containers that flare out and are open toward the top, punching out the temporary bottoms of these containers, welding, in place of these bottoms, peelable lids for the finished containers which are turned upside down, filling said containers through the open ends thereof, welding the future bottoms on the open upper ends of these containers and detaching the filled and welded containers from the sheet that has been heat formed.

2. A method according to claim 1 wherein the peelable lids and the final bottoms are made from two other sheets, that used for the bottoms being made of the same thermoplastic material as the sheet from which the containers are made, whereas the sheet for the lids is also made of the same thermoplastic material.

3. A method according to claim 1 wherein the peelable lids and the final bottoms are made from two other sheets, that used for the bottoms being made of the same thermoplastic material as the sheet from which the containers are made, whereas the sheet for the lids is made of aluminum of the thermoglueing type.

4. A device for making filled containers which comprises, in combination:
   means for heat forming, from a thermoplastic sheet containers flaring out and open toward the top,
   means for cutting the temporary bottoms of these containers,
   means for welding, at the place of these bottoms, peelable covers or lids for the finished containers which will be turned upside down,
   means for filling said containers through the open tops thereof,
   means for welding future bottoms to the open upper parts of these containers, and
   means for detaching the filled containers, on which the bottoms have been welded, from the sheet that has served to their manufacture.

5. A device according to claim 4 wherein the above mentioned means are carried by stations at least several of which are adjustable longitudinally along a machine frame.

References Cited

UNITED STATES PATENTS 3,267,639    8/1966    Ollier et al. _____ 53—184 X

FOREIGN PATENTS 1,196,104    11/1959    France.

TRAVIS S. McGEHEE, *Primary Examiner.*

E. F. DESMOND, *Assistant Examiner.*

U.S. Cl. X.R.

53—184